J. HARTMAN.
HARVESTER BUTT BOARD.
APPLICATION FILED JULY 11, 1914.
1,140,979.
Patented May 25, 1915.
2 SHEETS—SHEET 1.
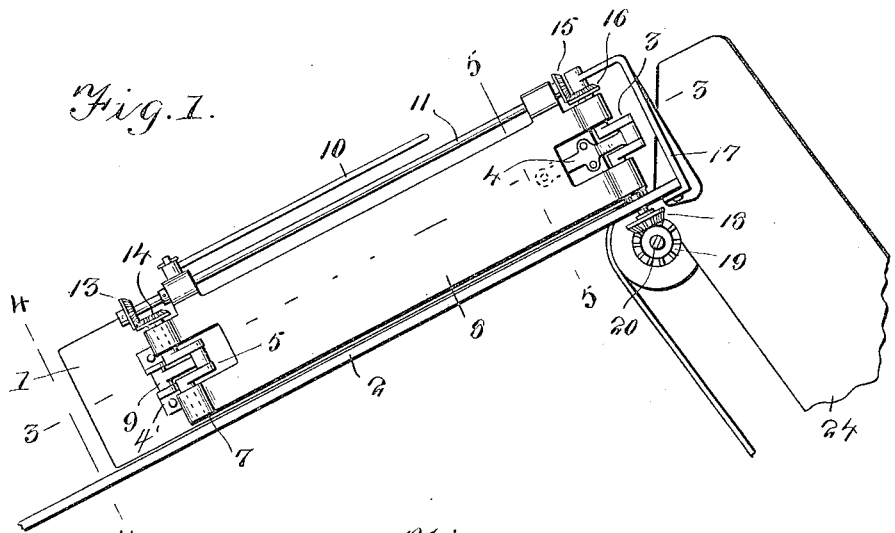
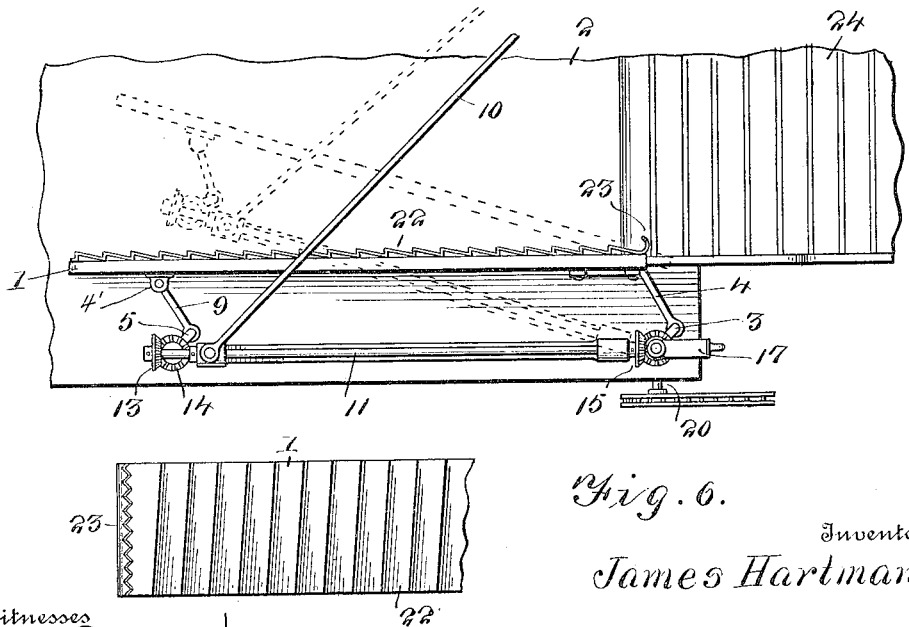
Inventor
James Hartman
By Victor J. Evans
Attorney
Witnesses

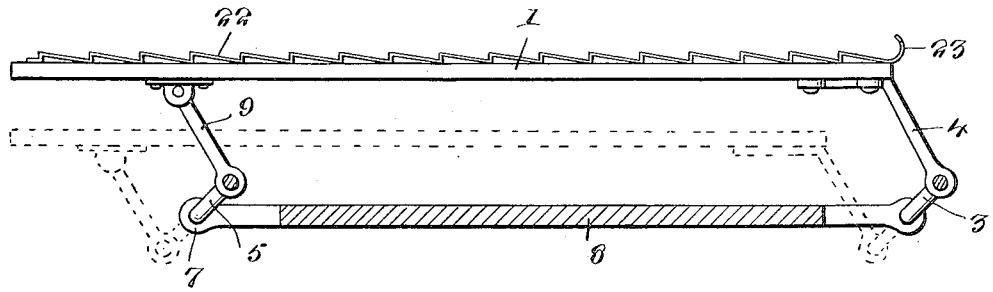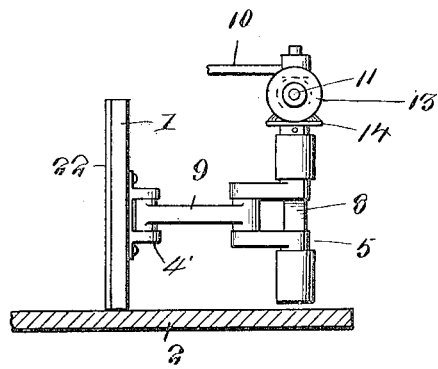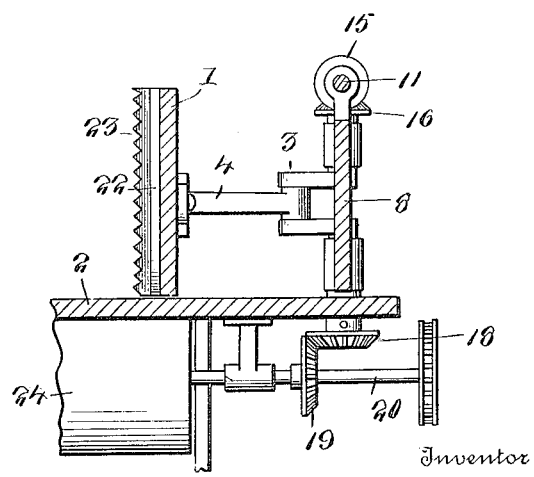

UNITED STATES PATENT OFFICE.

JAMES HARTMAN, OF BERN, KANSAS.

HARVESTER BUTT-BOARD.

1,140,979.

Specification of Letters Patent. Patented May 25, 1915.

Application filed July 11, 1914. Serial No. 850,356.

*To all whom it may concern:*

Be it known that I, JAMES HARTMAN, a citizen of the United States, residing at Bern, in the county of Nemaha and State of Kansas, have invented new and useful Improvements in Harvester Butt-Boards, of which the following is a specification.

The primary object of the invention is the provision of novel means for evening the butt ends of grain in the formation of bundles, sheaves or the like.

The invention provides a butt board and operating means therefor, whereby the butt board is moved uniformly throughout its extent so as practically to remain parallel to a given plane at any position in its movement.

A further purpose of the invention is to provide adjustable mountings for one end of the butt board, whereby it may be caused to swing so as to insure positive and certain action in the evening of the butt ends of the grain.

The invention consists of the novel features, details of construction and combination of parts, which hereinafter will be more particularly set forth, illustrated and claimed.

In the drawings hereto attached: Figure 1 is a view in elevation of a butt board embodying the invention. Fig. 2 is a top plan view, parts being broken away. Fig. 3 is a horizontal section on the line 3—3 of Fig. 1. Fig. 4 is a section on the line 4—4 of Fig. 1. Fig. 5 is a section on the line 5—5 of Fig. 1. Fig. 6 is a detail view of an end portion of the butt board.

Corresponding and like parts are referred to in the following description, and indicated in all the views of the drawings, by the same reference characters.

The numeral 1 designates the butt board which may be of any construction and material. The butt board is arranged at one side of the platform 2 in such a manner as to engage the butt ends of the grain so as to even the same in the formation of the bundle preliminary to binding the same in advance of delivering the bundle upon the ground or to a suitable carrier. A crank shaft 3 is located at one end of the butt board 1 and is connected with the driving mechanism of the harvester in any manner so as to receive movement therefrom. The board 8 is pivoted at one end in line with the crank shaft 3 which latter is mounted at its lower end in a bearing attached to the platform 2 and at its upper end in a bearing forming a part of the bracket 17 which is secured at its lower end to the platform 2. The crank portion of the crank shaft 3 is mounted in a bearing forming part of a bracket 4 which is secured to the butt board. A second crank shaft 5 is located at the opposite end of the butt board and its crank portion is connected with a bracket 4' which is secured to the butt board in any manner to admit of adjustment, if required. The crank shaft 5 is mounted in bearings 7 at one end of an upright 8 which consists of a board or piece of cast iron journaled at its upper end on the shaft 3. A link 9 connects the crank portion of the crank shaft 5 with the bracket 4'. The upright 8 is pivoted at one end and is free to swing laterally at its opposite end and is adapted to be secured in the required position by means of a rod 10 which in practice is adapted to be fastened in any convenient way to a part of the machine. This arrangement provides for swinging the butt board over the platform 2, as indicated by the dotted lines in Fig. 2. A longitudinal shaft 11 is mounted in bearings at the upper edge of the part 8 and is connected near opposite ends with the crank shafts 3 and 5 by suitable gearing. A bevel gear 13 secured to one end of the shaft 11 is in mesh with a bevel gear 14 made fast to the upper end of the crank shaft 5. A bevel gear 15 secured to the shaft 11 is in mesh with a bevel gear 16 made secure to the crank shaft 3. A bevel gear 18 secured to the lower end of the crank shaft 3 meshes with a bevel gear 19 attached to a shaft 20 of the machine which shaft receives power from a moving part.

The butt board 1, by reason of its connection with the crank portions of the crank shafts 3 and 5, moves throughout its length and is laterally adjustable at its rear end, so as to be adapted to the length of the grain being harvested. A plurality of ribs 22 extend across the active face of the butt board and such ribs have their rear faces straight and their front faces inclined so as to engage with the grain and feed the same forward in a positive manner. The ribs 22 may be formed in any manner either as a part of the butt board or separate therefrom and attached thereto. Teeth 23 are located at the front end of the butt board and insure a positive engagement with the butts of the grain so as to advance the same after clearing the side apron or guard of the elevator 24.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the invention as claimed.

Having thus described the invention, what is claimed as new is:—

A grain butting attachment for harvesting machines, comprising a base, a bracket secured at one end thereof, a crank shaft journaled in the bracket, an upright journaled at one end on the axis of said shaft and adapted to swing laterally at its opposite end, a crank shaft mounted on the upright adjacent said opposite end thereof, a butt board, connecting means between said butt board and the crank portions of said shafts, means for imparting rotary movement to the crank shaft on which the upright is journaled, and connecting means between such crank shaft and the crank shaft at the laterally swinging end of the upright for rotating the two crank shafts in unison.

In testimony whereof I affix my signature in presence of two witnesses.

JAMES HARTMAN.

Witnesses:
L. D. ALLEN,
R. E. WHITE.

Copies of this patent may be obtained for five cents each, by addressing the "Commissioner of Patents, Washington, D. C."